US012704415B2

(12) United States Patent
Yuan et al.

(10) Patent No.: US 12,704,415 B2
(45) Date of Patent: Aug. 11, 2026

(54) RESISTANCE MEASUREMENT METHOD AND APPARATUS FOR VAPORIZER, ELECTRONIC VAPORIZATION DEVICE, AND STORAGE MEDIUM

(71) Applicant: Shenzhen Verdewell Technology Limited, Shenzhen (CN)

(72) Inventors: Huakai Yuan, Shenzhen (CN); Pengfei Du, Shenzhen (CN)

(73) Assignee: Shenzhen Verdewell Technology Limited, Shenzhen (CN)

( * ) Notice: Subject to any disclaimer, the term of this patent is extended or adjusted under 35 U.S.C. 154(b) by 330 days.

(21) Appl. No.: 18/357,246

(22) Filed: Jul. 24, 2023

(65) Prior Publication Data

US 2024/0035895 A1 Feb. 1, 2024

(30) Foreign Application Priority Data

Aug. 1, 2022 (CN) ........................ 202210916583.7

(51) Int. Cl.

*G01K 1/20* (2006.01)
*F24F 6/02* (2006.01)
*F24F 11/64* (2018.01)
*F24F 110/10* (2018.01)

(52) U.S. Cl.

CPC ................ *G01K 1/20* (2013.01); *F24F 6/025* (2013.01); *F24F 11/64* (2018.01); *F24F 2110/10* (2018.01)

(58) Field of Classification Search

CPC .. G01K 1/20; A24F 40/10; F24F 11/64; F24F 6/025; F24F 2110/10
See application file for complete search history.

(56) References Cited

U.S. PATENT DOCUMENTS

2017/0261466 A1 9/2017 Saito et al.
2018/0303161 A1 10/2018 Bilat
2020/0000146 A1* 1/2020 Anderson ............. H02J 7/0045
2021/0161214 A1* 6/2021 Bilat .................... A61M 11/042
2022/0183384 A1 6/2022 Chen

FOREIGN PATENT DOCUMENTS

CN 107427080 A 12/2017
CN 108778002 A 11/2018
CN 109567280 A 4/2019

(Continued)

OTHER PUBLICATIONS

European Patent Office, Search Report in European Patent Application No. 23184992.8 (Jan. 2, 2024).

(Continued)

*Primary Examiner* — Stephen D Meier
*Assistant Examiner* — Quang X Nguyen
(74) *Attorney, Agent, or Firm* — Leydig, Voit & Mayer, Ltd.

(57) ABSTRACT

A resistance measurement method for a vaporizer includes: reading a resistance value of the vaporizer every first preset time to obtain a first preset number of first resistance values; starting the vaporizer and lasting for a second preset time; reading the resistance value of the vaporizer every third preset time to obtain a second preset number of second resistance values; and calculating an average of the first resistance value and the second resistance value as an initial resistance value of the vaporizer.

20 Claims, 6 Drawing Sheets

(56) References Cited

FOREIGN PATENT DOCUMENTS

| | | | |
|---|---|---|---|
| CN | 109619688 | A | 4/2019 |
| CN | 110558617 | A | 12/2019 |
| CN | 110584204 | A | * 12/2019 |
| CN | 111134371 | A | 5/2020 |
| EP | 4319480 | A1 | 2/2024 |
| JP | 5861474 | A | 4/1983 |
| JP | 201065661 | A | 3/2010 |
| JP | 202152799 | A | 4/2021 |
| WO | 2022087904 | A1 | 5/2022 |

OTHER PUBLICATIONS

Chinese Patent Office, Office Action in Chinese Patent Application No. 202210916583.7 (Mar. 20, 2025).

Chinese Patent Office, Office Action in Chinese Patent Application No. 202210916583.7 (Jul. 24, 2025).

Canadian Intellectual Property Office, First Office Action in Canadian Patent Application No. 3,206,714 (Aug. 27, 2025).

Yongsheng Zhao, "Electrical Testing and Typical Fault Analysis and Treatment of Transformer and Distribution Equipment," China Machinery Industry Press, pp. 89-90, Jun. 2012 (with English Abstract).

Canadian Intellectual Property Office, Office Action in Canadian Patent Application No. 3,206,714 (Apr. 15, 2026).

* cited by examiner

RESISTANCE MEASUREMENT METHOD AND APPARATUS FOR VAPORIZER, ELECTRONIC VAPORIZATION DEVICE, AND STORAGE MEDIUM

CROSS-REFERENCE TO PRIOR APPLICATION

Priority is claimed to Chinese Patent Application No. 202210916583.7, filed on Aug. 1, 2022, the entire disclosure of which is hereby incorporated by reference herein.

FIELD

This application relates to the field of vaporization device, and in particular, to a resistance measurement method and apparatus for a vaporizer, an electronic vaporization device, and a storage medium.

BACKGROUND

The temperature coefficient of resistance (TCR for short) represents a relative change in a resistance value of a resistor when the temperature changes by 1 degree Celsius. After an initial temperature, an initial resistance value, and a current resistance value are learned, a current temperature may be calculated according to the TCR, which is beneficial to the temperature control of a vaporization device. Therefore, identification of the initial resistance value and the initial temperature of a vaporizer is very important in the solution using the TCR.

Currently, in the electronic vaporization device, during the identification of the initial resistance value of the vaporizer, the vaporizer may generate a contact resistance during contact, resulting in a certain deviation in the identification of the initial resistance value.

SUMMARY

In an embodiment, the present invention provides a resistance measurement method for a vaporizer, comprising: reading a resistance value of the vaporizer every first preset time to obtain a first preset number of first resistance values; starting the vaporizer and lasting for a second preset time; reading the resistance value of the vaporizer every third preset time to obtain a second preset number of second resistance values; and calculating an average of the first resistance value and the second resistance value as an initial resistance value of the vaporizer.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
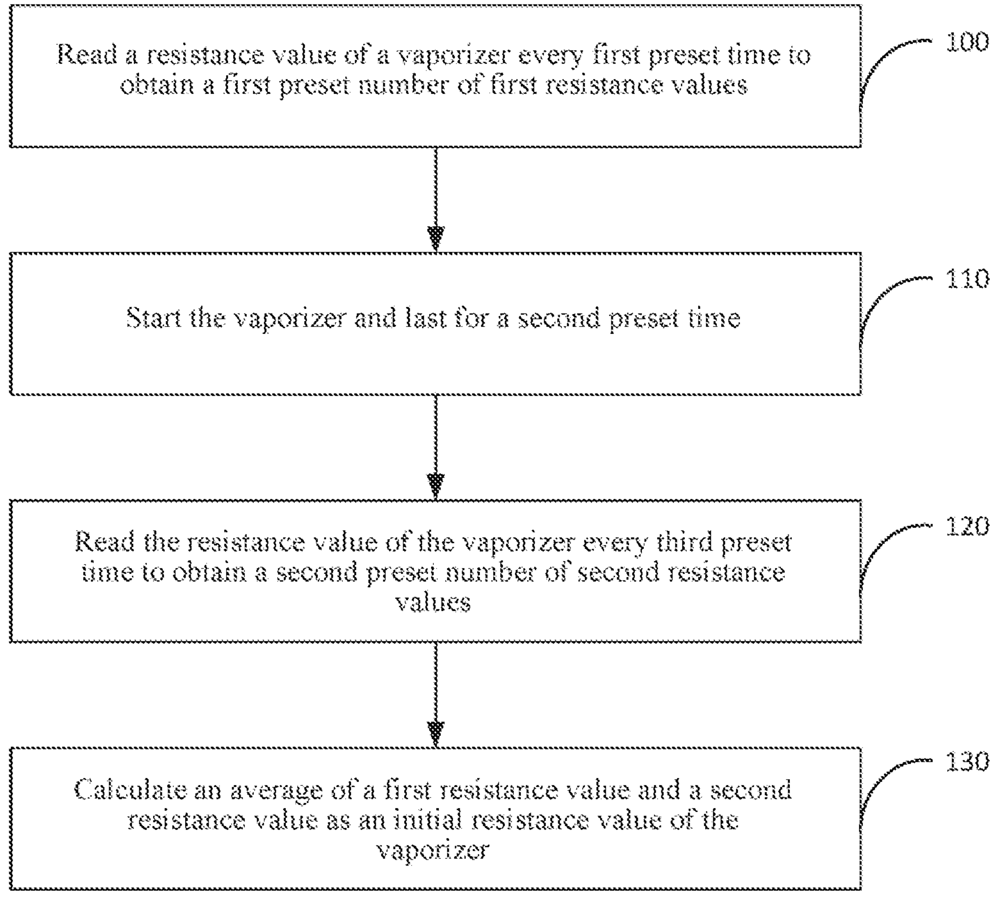
FIG. 1 is a schematic flowchart of a resistance measurement method for a vaporizer according to a first embodiment.

In an embodiment, the present invention provides a resistance value measurement method and apparatus for a vaporizer, an electronic vaporization device, and a storage medium that can improve the accuracy of measurement of an initial resistance value of the vaporizer.

According to a first aspect, this application provides a resistance measurement method for a vaporizer. The method includes:

reading a resistance value of the vaporizer every first preset time to obtain a first preset number of first resistance values;

starting the vaporizer and lasting for a second preset time;

reading the resistance value of the vaporizer every third preset time to obtain a second preset number of second resistance values; and calculating an average of the first resistance value and the second resistance value as an initial resistance value of the vaporizer.

In an embodiment, the method includes before the starting the vaporizer and lasting for a second preset time:

determining a fluctuation range of the first resistance value; and performing the following steps if the fluctuation range of the first resistance value is within a preset fluctuation range: starting the vaporizer and lasting for a second preset time; and determining that a state of the vaporizer is abnormal and generating corresponding alarm information if the fluctuation range of the first resistance value is not within the preset fluctuation range.

In an embodiment, the determining a fluctuation range of the first resistance value includes:

calculating a difference between adjacent first resistance values to obtain a plurality of differences; and calculating the fluctuation range of the first resistance value according to the plurality of differences.

In an embodiment, the method includes between the step of the starting the vaporizer and lasting for a second preset time and the step of the reading the resistance value of the vaporizer every third preset time to obtain a second preset number of second resistance values:

reading the resistance value of the vaporizer to obtain a third resistance; and performing the following steps if the third resistance is within a preset resistance range: reading the resistance value of the vaporizer every third preset time to obtain a second preset number of second resistance values; and generating corresponding alarm information if the third resistance is not within the preset resistance range.

In an embodiment, the method includes before the calculating an average of the first resistance value and the second resistance value as an initial resistance value of the vaporizer:

determining an average of the first resistance value and an average of the second resistance value; and performing the following steps if a difference between the average of the first resistance value and the average of the second resistance value is within a preset difference range: calculating an average of the first resistance value and the second resistance value as the initial resistance value of the vaporizer; and generating corresponding alarm information if the difference between the average of the first resistance value and the average of the second resistance value is not within the preset difference range.

In an embodiment, the method includes before the reading a resistance value of the vaporizer every first preset time to obtain a first preset number of first resistance values:

detecting a port level of a processor in an electronic vaporization device to which the vaporizer belongs; and performing the following step if it is detected that the port level of the processor drops: reading a resistance value of the vaporizer every first preset time to obtain a first preset number of first resistance values.

In an embodiment, the method further includes:

acquiring a current ambient temperature through an ambient temperature sensor; and calibrating a temperature parameter in a reference temperature resistance parameter of the vaporizer as the current ambient temperature.

According to a second aspect, this application further provides a resistance measurement apparatus for a vaporizer. The apparatus includes:

a first resistance value acquisition module, configured to read a resistance value of the vaporizer every first preset time to obtain a first preset number of first resistance values;

a vaporizer starting module, configured to start the vaporizer and last for a second preset time;

a second resistance value acquisition module, configured to read the resistance value of the vaporizer every third preset time to obtain a second preset number of second resistance values; and a calculation module, configured to calculate an average of the first resistance value and the second resistance value as an initial resistance value of the vaporizer.

According to a third aspect, this application further provides an electronic vaporization device. The electronic vaporization device includes a memory and a processor, the memory storing a computer program, and the processor, when executing the computer program, implementing the following operations:

reading a resistance value of the vaporizer every first preset time to obtain a first preset number of first resistance values;

starting the vaporizer and lasting for a second preset time; and reading the resistance value of the vaporizer every third preset time to obtain a second preset number of second resistance values; and calculating an average of the first resistance value and the second resistance value as an initial resistance value of the vaporizer.

According to a fourth aspect, this application further provides a computer-readable storage medium. The computer-readable storage medium stores a computer program. The computer program, when executed by a processor, causing the processor to implement the following operations:

reading a resistance value of the vaporizer every first preset time to obtain a first preset number of first resistance values;

starting the vaporizer and lasting for a second preset time;

reading the resistance value of the vaporizer every third preset time to obtain a second preset number of second resistance values; and calculating an average of the first resistance value and the second resistance value as an initial resistance value of the vaporizer.

According to the resistance measurement method and apparatus for the vaporizer, the electronic vaporization device, and the storage medium, reading a resistance value of the vaporizer every first preset time to obtain a first preset number of first resistance values; starting the vaporizer and lasting for a second preset time; reading the resistance value of the vaporizer every third preset time to obtain a second preset number of second resistance values; and calculating an average of the first resistance value and the second resistance value as an initial resistance value of the vaporizer. In this way, in this application, the first resistance value of the vaporizer is acquired for a plurality of times, and the second preset time of the vaporizer is started, and the second resistance value of the vaporizer is acquired for a plurality of times. Finally, the average value of the first resistance value and the second resistance value are calculated as the initial resistance value of the vaporizer. The method of reading the resistance value a plurality of times and then taking the average value ensures the accuracy of the result, and at the same time avoids the contact resistance generated by the vaporizer during contact. Therefore, the accuracy of the initial resistance measurement of the vaporizer is improved.

To make the objectives, technical solutions, and advantages of this application clearer, the following further describes this application in detail with reference to the accompanying drawings and the embodiments. It is to be understood that the specific embodiments described herein are only used for explaining this application, and are not used for limiting this application.

In an embodiment, as shown in FIG. 1, a resistance measurement method for a vaporizer is provided, which includes the following steps:

Step 100: Read a resistance value of the vaporizer every first preset time to obtain a first preset number of first resistance values.

The method described in this application may be applied to an electronic vaporization device, and may also be applied to other devices for measuring a resistance value of a vaporizer.

Specifically, when the resistance value of the vaporizer is measured, the vaporizer may be connected to the electronic vaporization device or other measurement devices. Then, the resistance value of the vaporizer is read every first preset time to obtain a corresponding first preset number of resistance values. For convenience of description, the resistance value obtained in this step is defined as a first resistance value. The first preset time may be any time between 0.1 seconds and 1 second. For example, the resistance value of the vaporizer is read every 0.5 seconds. In order to ensure the accuracy of the result, the first preset number is a natural number greater than or equal to 2.

Step 110: Start the vaporizer and last for a second preset time.

The vaporizer is started and caused to operate normally for the second preset time. The second preset time may be any time between 0.3 seconds and 1 second. Since the second preset time is shorter, in a normal state (the vaporizer is arranged to operate normally in a vaporization liquid), a starting time of the vaporizer is short, and the resistance value thereof does not change much. During specific implementation, other times may be used as the second preset time. It may be understood that the second preset time should not be excessively long. If the starting time of the vaporizer is excessively long, the temperature of the vaporizer is relatively high. After the vaporizer is cooled, the resistance value measurement process of the vaporizer needs to be performed again. In this application, starting the vaporizer for the second preset time may change the state of the vaporizer, confirm whether a temperature coefficient of resistance (TCR) of the vaporizer is normal, and may also lay the foundation for subsequent accurate measurement.

Step 120: Read the resistance value of the vaporizer every third preset time to obtain a second preset number of second resistance values.

After the vaporizer continues to operate for the second preset time, the resistance value of the vaporizer is read every third preset time to obtain the corresponding second preset number of resistance values. For convenience of description, the resistance value obtained in this step is defined as a second resistance value. The third preset time may or may not be the same as the first preset time, which is not limited here. Similarly, the second preset number and the first preset number may also be the same, and may also be different in a concrete implementation, which are not limited here.

It may be understood that the first preset number and the second preset number may both be 1. If the first preset number and the second preset number are both 1, the accuracy of the result is reduced. However, compared with the method in the prior art (the resistance value of the vaporizer is read as the initial resistance value of the vaporizer when directly accessing the vaporizer), the accuracy is also improved.

Step 130: Calculate an average of the first resistance value and the second resistance value as an initial resistance value of the vaporizer.

After obtaining a plurality of first resistance values and a plurality of second resistance values, the average value of the plurality of first resistance values and the plurality of second resistance values is calculated, and the calculated average value is taken as the initial resistance value of the vaporizer.

According to the resistance measurement method of the vaporizer, reading a resistance value of the vaporizer every first preset time to obtain a first preset number of first resistance values; starting the vaporizer and lasting for a second preset time; reading the resistance value of the vaporizer every third preset time to obtain a second preset number of second resistance values; and calculating an average of the first resistance value and the second resistance value as an initial resistance value of the vaporizer. In this way, in this application, the first resistance value of the vaporizer is acquired for a plurality of times, and the second preset time of the vaporizer is started, and the second resistance value of the vaporizer is acquired for a plurality of times. Finally, the average value of the first resistance value and the second resistance value are calculated as the initial resistance value of the vaporizer. The method of reading the resistance value a plurality of times and then taking the average value ensures the accuracy of the result, and at the same time avoids the contact resistance generated by the vaporizer during contact. Therefore, the accuracy of the initial resistance measurement of the vaporizer is improved.

Figures 2, 3:
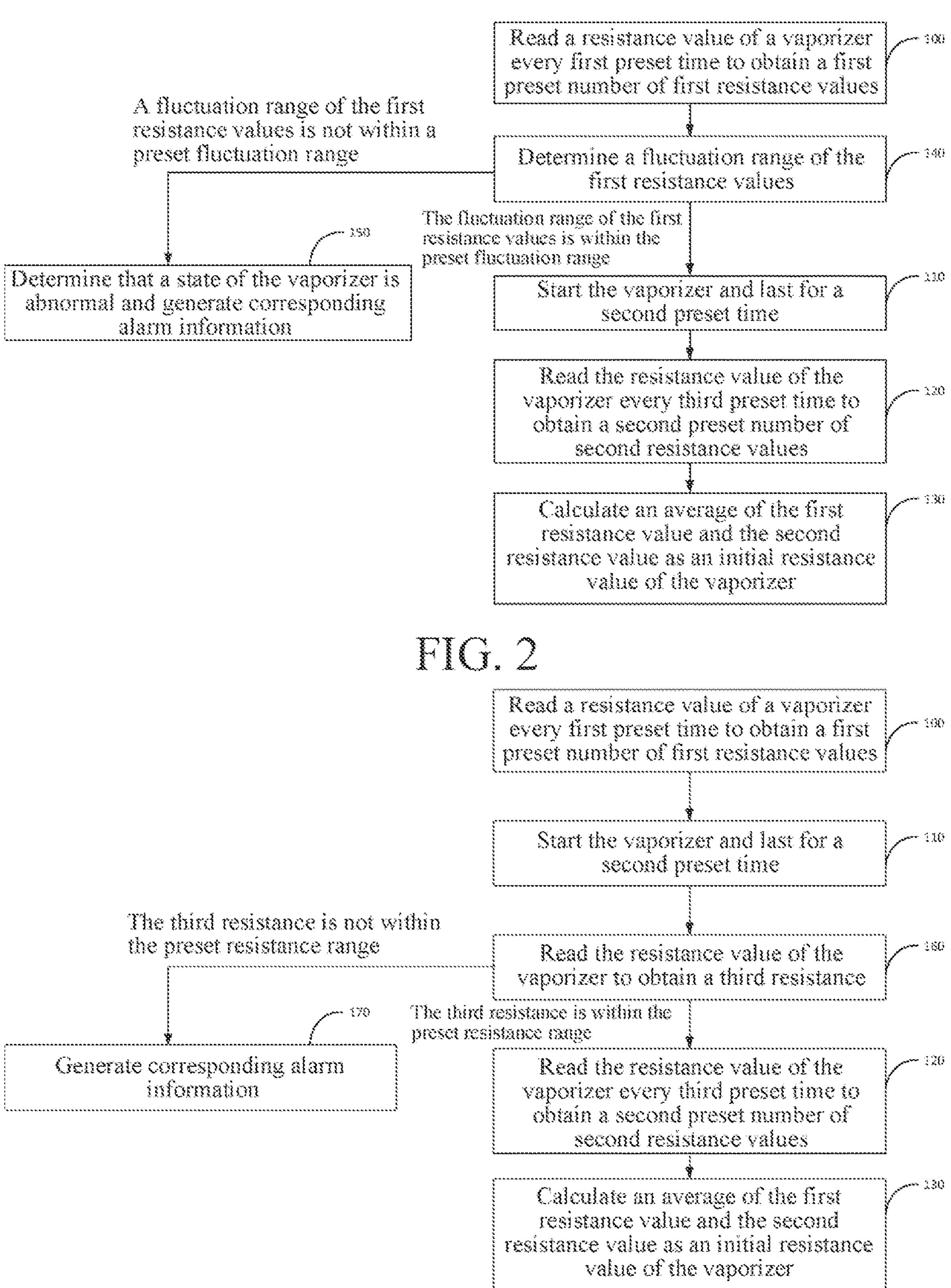
FIG. 2 is a schematic flowchart of a resistance measurement method for a vaporizer according to a second embodiment.
FIG. 3 is a schematic flowchart of a resistance measurement method for a vaporizer according to a third embodiment.

In an embodiment, as shown in FIG. 2, the resistance measurement method for a vaporizer further includes the following steps.

Step 140: Determine a fluctuation range of the first resistance value.

Step 110 of starting the vaporizer and lasting for a second preset time is performed if the fluctuation range of the first resistance values is within a preset fluctuation range.

Step 150: Determine that a state of the vaporizer is abnormal and generate corresponding alarm information.

In this embodiment, in order to improve the accuracy of the resistance measurement result, after obtaining a plurality of first resistances, a fluctuation range of the first resistance is determined according to the obtained plurality of first resistances. If the fluctuation range of the first resistance is within the preset fluctuation range, it is considered that the state of the vaporizer is normal, and step 110 is continued. If the fluctuation range of the first resistance is not within the preset fluctuation range, it is determined that the state of the vaporizer is abnormal (the abnormal state includes dry heating of the vaporizer, TCR exceeding the range, and so on). If the state of the vaporizer is abnormal, the resistance value obtained by a test must be faulty. In this case, the corresponding alarm information is generated. The electronic vaporization device can control an abnormal state display light to display according to the alarm information, to remind a user or display the alarm information on a display in the electronic vaporization device to remind the user. In this embodiment, the preset fluctuation range is [−10%, 10%]. After the state of the vaporizer is considered abnormal, a period of time (30 seconds to 60 seconds for an example) may be waited and then this step is performed again. That is to say, the resistance value of the vaporizer is read every first preset time to acquire the plurality of first resistance values again.

In this embodiment, the step of determining a fluctuation range of the first resistance value includes:

- calculating a difference between adjacent first resistance values to obtain a plurality of differences; and
- calculating the fluctuation range of the first resistance value according to the plurality of differences.

Specifically, in this embodiment, the process of determining a fluctuation range of the first resistance value includes: calculating a difference between adjacent first resistance values to obtain a plurality of differences, and calculating the fluctuation range of the first resistance values according to the obtained plurality of differences. It should be noted that the number of the first resistance values in this embodiment is a natural number greater than or equal to 3. When the number of the first resistance values is greater than or equal to 3, the plurality of differences can be obtained. For example, the number of the first resistance values is 4, which are respectively $R_1$, $R_2$, $R_3$, and $R_4$. $R_2-R_1=R_{21}$, $R_3-R_2=R_{32}$, $R_4-R_3=R_{43}$, and then the fluctuation range of the first resistance values is calculated according to $R_{21}$, $R_{32}$, and $R_{43}$. The fluctuation of the first resistance value may be calculated by using the following formula: $R_{21}/R_1$, $R_{32}/R_2$, and $R_{43}/R_3$. The fluctuation range of the first resistance values is determined according to the calculated fluctuation. For example, $R_{21}/R_1=5\%$, $R_{32}/R_2=-5\%$, and $R_{43}/R_3=6\%$, and the fluctuation range of the first resistance values is [−5%, 6%]. During specific implementation, the fluctuation range of the first resistance values may further be determined in other manners. For example, the calculated plurality of differences forms a graph, the fluctuation range of the first resistance values is determined through the graph, and then it is determined whether the fluctuation range of the first resistance values is within a preset range.

In an embodiment, as shown in FIG. 3, the resistance measurement method for a vaporizer further includes the following steps.

Step 160: Read the resistance value of the vaporizer to obtain a third resistance.

Step 120 of reading the resistance value of the vaporizer every third preset time to obtain a second preset number of second resistance values is performed if the third resistance is within the preset resistance range.

Step 170: Generate corresponding alarm information.

Specifically, in this embodiment, after starting the vaporizer and before acquiring the second resistance value of the vaporizer, the resistance value of the vaporizer is further read to obtain the resistance after the vaporizer continues to operate for the second preset time, which is defined as the third resistance. After obtaining the third resistance of the vaporizer, it is determined whether the third resistance is within the preset resistance range. Generally, because of a short operating time of the vaporizer, if the vaporizer is normally immersed in oil (a vaporization liquid), the vaporizer can operate normally, and the resistance value does not change much (exemplarily, the vaporizer operates for 0.3 seconds to 1 seconds, and the resistance changes to increase by 20 milliohms to 50 milliohms). Therefore, the preset resistance range of the vaporizer is necessarily to be set according to experience, and then whether the obtained third resistance is within the preset resistance range is determined, to determine whether the vaporizer can operate normally. Exemplarily, the preset resistance range is [0.5 Ω, 2 Ω]. Step 120 is performed if the third resistance is within the preset resistance range: read the resistance value of the vaporizer every third preset time to obtain a second preset number of second resistance values.

If the third resistance is not within the preset resistance range, it means that the vaporizer cannot operate normally (for example, the abnormal operating state of the dry heating of the vaporizer due to an absence of the vaporization liquid). In this case, the corresponding alarm information is generated, to prompt the user and exit an initial resistance value measurement process of the vaporizer.

It should be noted that the alarm information generated in step 170 and step 150 may be the same or different. Exemplarily, if the electronic vaporization device uses an indicator light to display the alarm information, the alarm information generated in step 170 and step 150 is the same; and if the electronic vaporization device uses the display to display the alarm information, the alarm information generated in step 170 and step 150 may be different, so that the user can distinguish a specific situation of the alarm. For example, the alarm information generated in step 170 is: the vaporizer resistance changes too much after the vaporizer continuously operates for 1 second; and the alarm information generated in step 150 is: the value of the read vaporizer fluctuates greatly after the vaporizer is connected. It may be understood that if the electronic vaporization device uses the indicator light to display the alarm information, the alarm information generated in step 170 and step 150 may also be different. The alarm information is different, and a display frequency/color of the indicator light is different.

Figure 4:
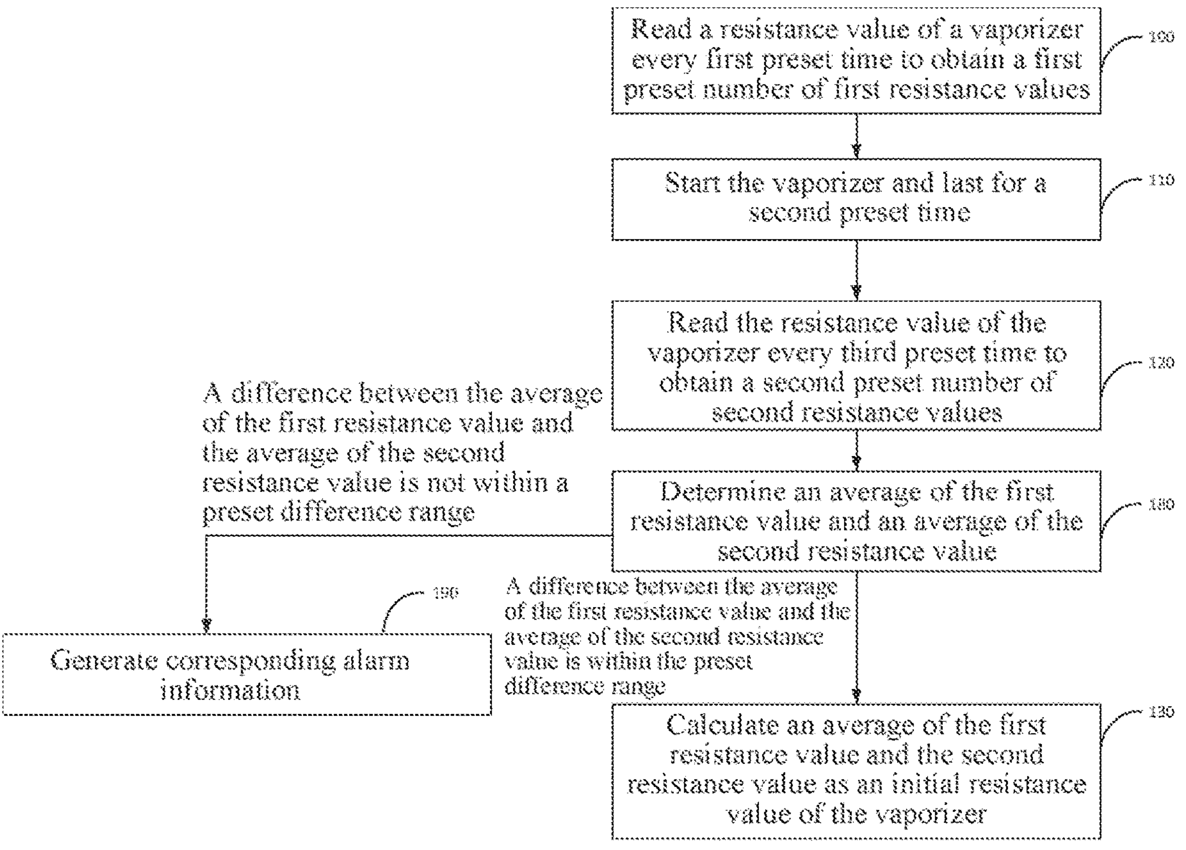
FIG. 4 is a schematic flowchart of a resistance measurement method for a vaporizer according to a fourth embodiment.

In an embodiment, as shown in FIG. 4, the resistance measurement method for a vaporizer further includes the following steps.

Step 180: Determine an average of the first resistance value and an average of the second resistance value;

Step 130 of calculating an average of the first resistance value and the second resistance value as the initial resistance value of the vaporizer is performed if a difference between the average value of the first resistance value and the average value of the second resistance value is within a preset difference range.

Step 190: Generate corresponding alarm information.

Specifically, in this embodiment, after obtaining a plurality of second resistance values, the average value of the first resistance value and the average value of the second resistance value are calculated. A difference range between the two is determined according to the average value of the first resistance value and the average value of the second resistance value. Then, whether the vaporizer is in reliable contact is determined according to whether the difference range of the two averages is within the preset difference range. If the difference range between the two averages is within the preset difference range, it means that the vaporizer is in reliable contact, and step 130 is performed: calculate an average of the first resistance value and the second resistance value as the initial resistance value of the vaporizer; and if the difference range between the two is not within the preset difference range, it means that the vaporizer is not in reliable contact, and the corresponding alarm information is generated in this case. The difference range between the two is determined according to the average value of the first resistance value and the average value of the second resistance value, which may specifically include: calculating a difference between the average of the first resistance value and the average value of the second resistance value, calculating a ratio of the difference to the average of the first resistance value, and comparing the ratio with the preset difference range. Exemplarily, the preset difference range is [−10%, 10%].

It should be noted that the alarm information generated in step 190 and step 150 may be the same or different. Exemplarily, if the electronic vaporization device uses an indicator light to display the alarm information, the alarm information generated in step 190 and step 150 is the same; and if the electronic vaporization device uses the display to display the alarm information, the alarm information generated in step 190 and step 150 may be different, so that the user can distinguish a specific situation of the alarm. For example, the alarm information generated in step 190 is: the vaporizer contact is not in reliable contact; and the alarm information generated in step 150 is: the value of the read vaporizer fluctuates greatly after the vaporizer is connected. It may be understood that if the electronic vaporization device uses the indicator light to display the alarm information, the alarm information generated in step 190 and step 150 may also be different. The alarm information is different, and a display frequency/color of the indicator light is different.

Figure 5:
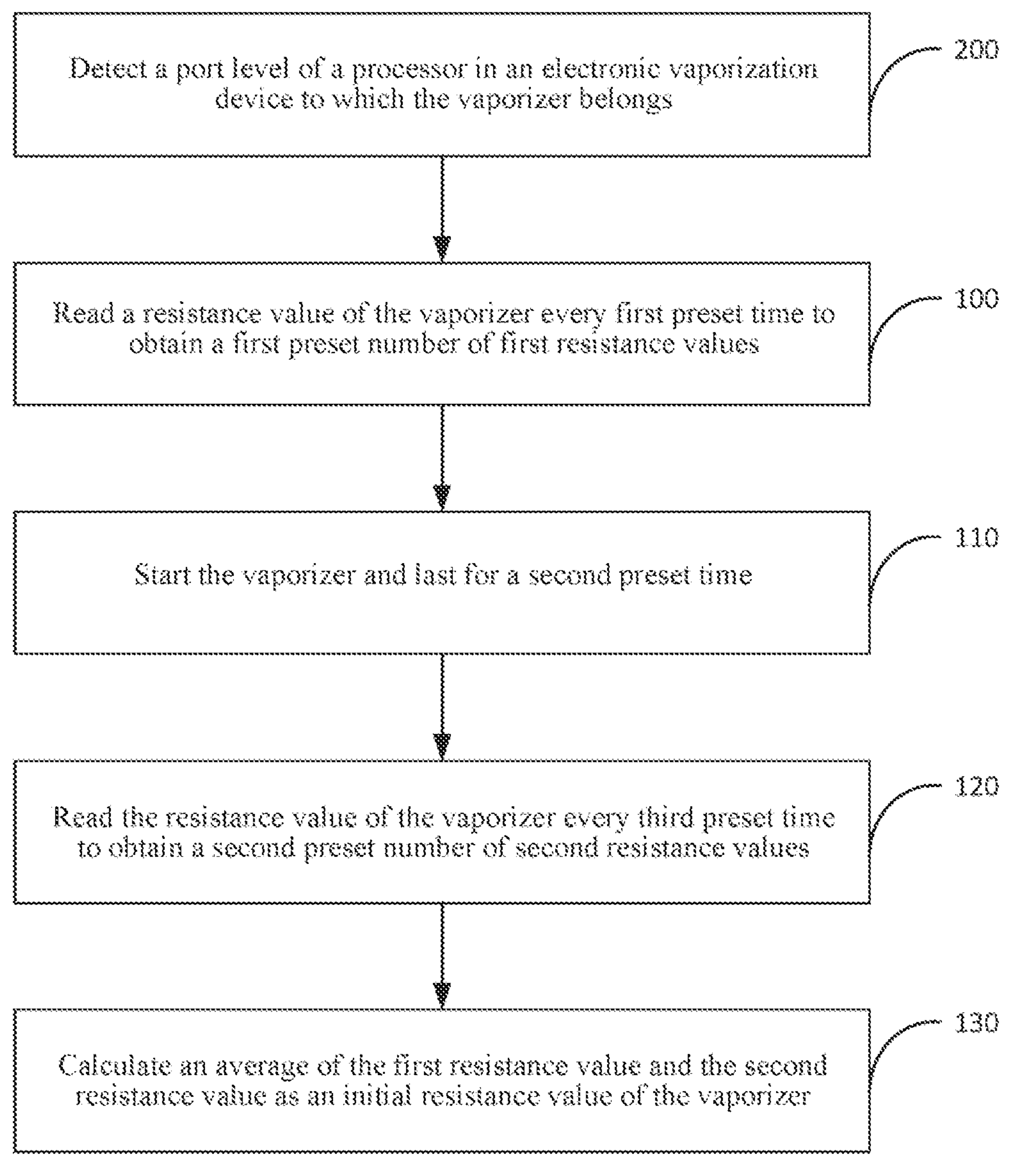
FIG. 5 is a schematic flowchart of a resistance measurement method for a vaporizer according to a fifth embodiment.

In an embodiment, as shown in FIG. 5, the resistance measurement method for a vaporizer further includes the following steps.

Step 200: Detect a port level of a processor in an electronic vaporization device to which the vaporizer belongs.

Step 100 of reading a resistance value of the vaporizer every first preset time to obtain a first preset number of first resistance values is performed if it is detected that the port level of the processor drops.

Specifically, before the process of starting the resistance measurement of the vaporizer, in this embodiment, this application further detects the port level of the processor in the electronic vaporization device to which the vaporizer belongs. If a falling edge appears on the port level of the processor, it means that the vaporizer is connected. In this case, the processor is woken up or triggered to start the process of measuring the resistance of the vaporizer, that is, step 100 starts to be performed. In a specific implementation, the processor can also be triggered by a physical button (exemplarily, the physical button may be a reset button or a power button) in the electronic vaporization device to start the process of measuring the resistance of the vaporizer.

Figure 6:
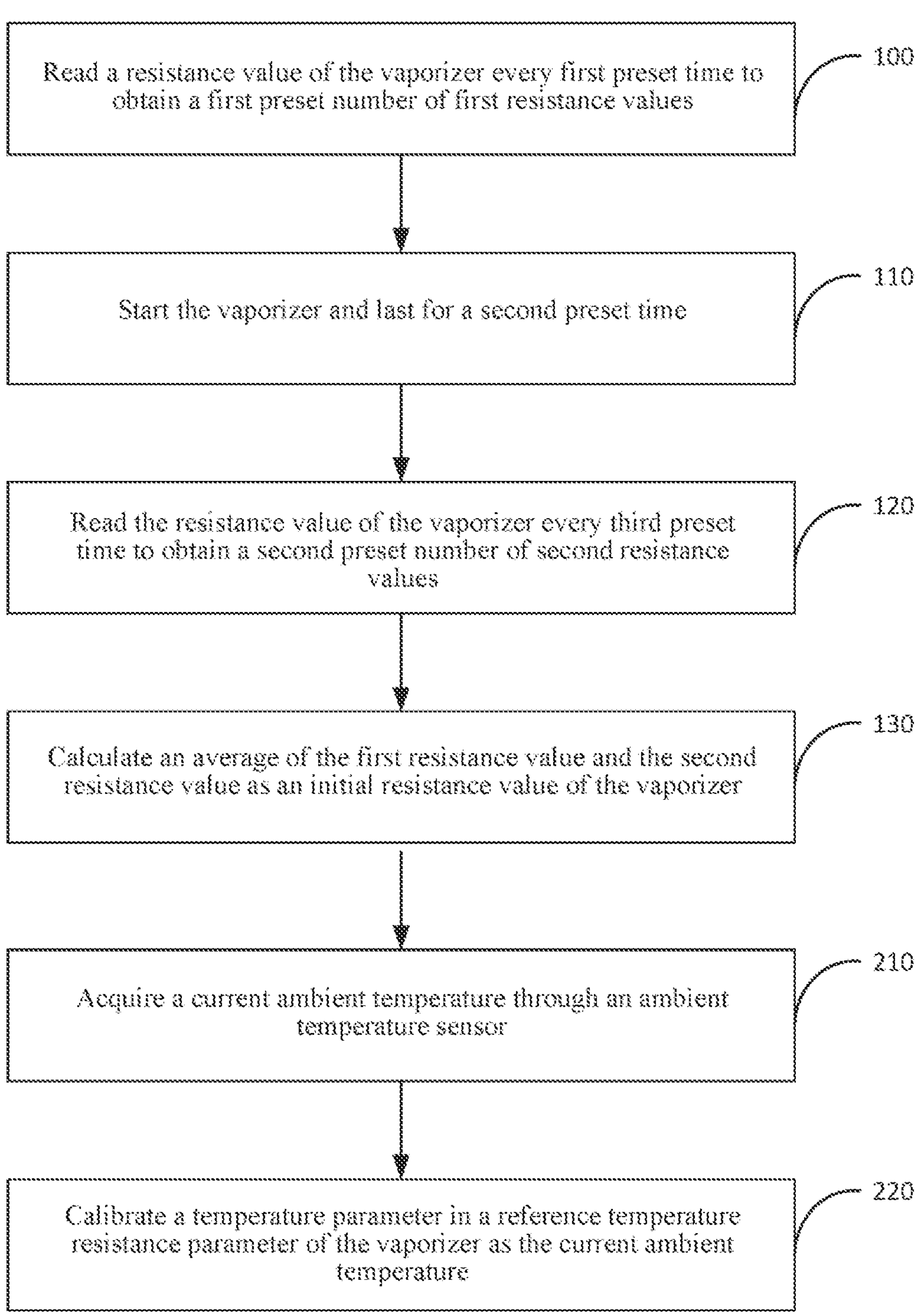
FIG. 6 is a schematic flowchart of a resistance measurement method for a vaporizer according to a sixth embodiment.

In an embodiment, as shown in FIG. 6, the resistance measurement method for a vaporizer further includes the following steps.

Step 210: Acquire a current ambient temperature through an ambient temperature sensor.

Step 220: Calibrate a temperature parameter in a reference temperature resistance parameter of the vaporizer as the current ambient temperature.

Specifically, the above steps to measure the resistance value of the vaporizer is intended to deduce the temperature of the vaporizer according to the TCR, so as to facilitate control of the electronic vaporization device. However, an initial temperature of the vaporizer is usually set at a room temperature (25°) in the prior art. The location of the electronic vaporization device may be anywhere in the world, that is, the ambient temperature of the vaporizer may be −30°, −10°, 0°, 40°, and so on. The initial temperature of the vaporizer is set to 25° is not conducive to the control of the electronic vaporization device. Therefore, in this embodiment, after completing the measurement of the resistance of the vaporizer, that is, after obtaining the initial resistance value of the vaporizer, the current ambient temperature is further acquired through the ambient temperature sensor arranged in the electronic vaporization device, which is used as the initial temperature of the electronic vaporization device to complete calibration of the temperature parameters.

In an embodiment, the resistance measurement method for a vaporizer may include: detecting the port level of the processor in the electronic vaporization device. When a falling edge is detected in the port level of the processor, it means that the vaporizer is connected. In this case, the processor is woken up or triggered to start the process of measuring the resistance of the vaporizer.

The resistance value of the vaporizer is read every first preset time to obtain a plurality of first resistance values, and a fluctuation range of the obtained plurality of first resistance values is determined. If the fluctuation range of the plurality of first resistance values is within the preset fluctuation range, it indicates that the vaporizer is connected normally.

After it is determined that the vaporizer is in a normal state, the vaporizer is started to operate normally for a second preset time, and then the resistance value of the vaporizer is read. If the resistance value of the vaporizer is within the preset resistance value range in this case, it indicates that the TCR of the vaporizer is normal. If the resistance value of the vaporizer is not within the preset resistance value range, which indicates that the TCR may exceed the range, or the vaporization liquid is in a condition such as being insufficient, dry heating, and so on, the vaporizer gives an alarm and exits a current identification state.

After it is determined that the TCR of the vaporizer is normal, the resistance of the vaporizer is read every third preset time to obtain the second preset number of second resistance values (it may be understood that the third preset time may be the same as the first preset time, and the second preset number may also be the same as the first preset number), and then the average of the second resistance value is taken and compared with the average of the first resistance value. If the difference between the two averages is within the preset difference range, the average of the second resistance value and the average of the first resistance value are then averaged as a measurement result. That is to say, all of the first resistance values and the second resistance values are averaged to obtain the initial resistance value of the vaporizer.

Figure 7:
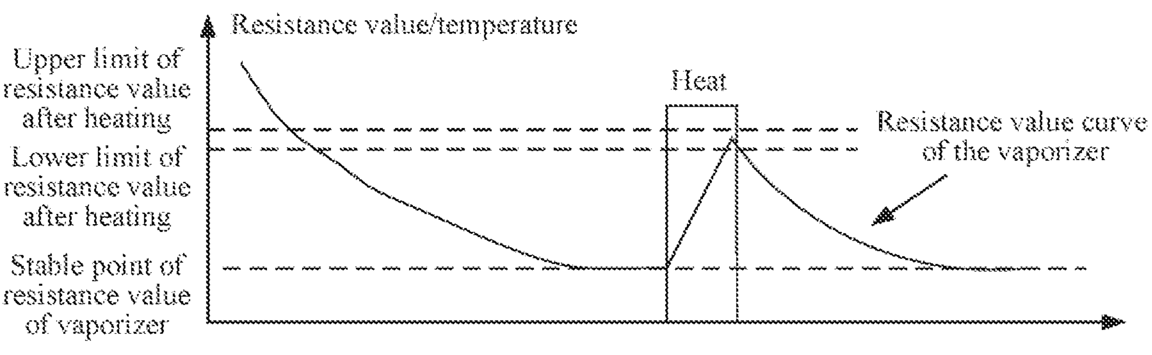
FIG. 7 is a schematic diagram of a resistance change curve of a vaporizer according to an embodiment.

After the initial resistance value of the vaporizer is obtained, the current ambient temperature is acquired. As the initial temperature, the parameters in the TCR are calibrated according to the initial resistance value and the initial temperature. After the calibration is completed, the vaporizer can be used normally. The resistance value of the vaporizer through the above process is shown in FIG. 7. When the vaporize is connected, the resistance value reaches the maximum and then gradually decreases. At the second preset time when the vaporizer is started to operate normally, the resistance value of the vaporizer increases (that is, a heating section in the figure), and the normal operation of the vaporizer ends (the heating ends). Under a normal circumstance, the resistance of the vaporizer decreases again. Therefore, in this application, the first resistance value and the second resistance value are acquired a plurality of times before and after the heating, and then the average values of the two are obtained, so that the resistance value closer to the real resistance of the vaporizer can be obtained as the initial value.

$TCR=dR/R*dT=(R_i-R_0)/R_0*(T_i-T_0)$, where $R_i$ represents a current resistance value of the vaporizer, $R_0$ represents an initial resistance value of the vaporizer, $T_i$ represents a current temperature of the electronic vaporization device, and $T_0$ represents an initial temperature of the vaporizer. During normal use, the current resistance value $R_i$ of the vaporizer can be read, and the current temperature $T_i$ of the vaporizer can be calculated by learning $R_0$, $T_0$, and TCR, which is convenient for temperature control of the electronic vaporization device.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this application, execution of the steps is not strictly limited, and the steps may be performed in other sequences. Moreover, at least some of the steps in each embodiment may include a plurality of steps or a plurality of stages. The steps or stages are not necessarily performed at the same moment but may be performed at different moments. Execution of the steps or stages is not necessarily sequentially performed, but may be performed alternately with other steps or at least some of steps or stages of other steps.

Based on the same inventive concept, the embodiments of this application further provide a resistance measurement apparatus for a vaporizer for realizing the resistance measurement method of the vaporizer involved above. The implementation provided by the apparatus to solve the problem is similar to the implementation described in the above method. Therefore, the specific limitations in the embodiments of the resistance measurement apparatus of one or more vaporizers provided below can be referred to the limitations of the resistance measurement method of the vaporizer above, which are not be repeated here.

Figure 8:
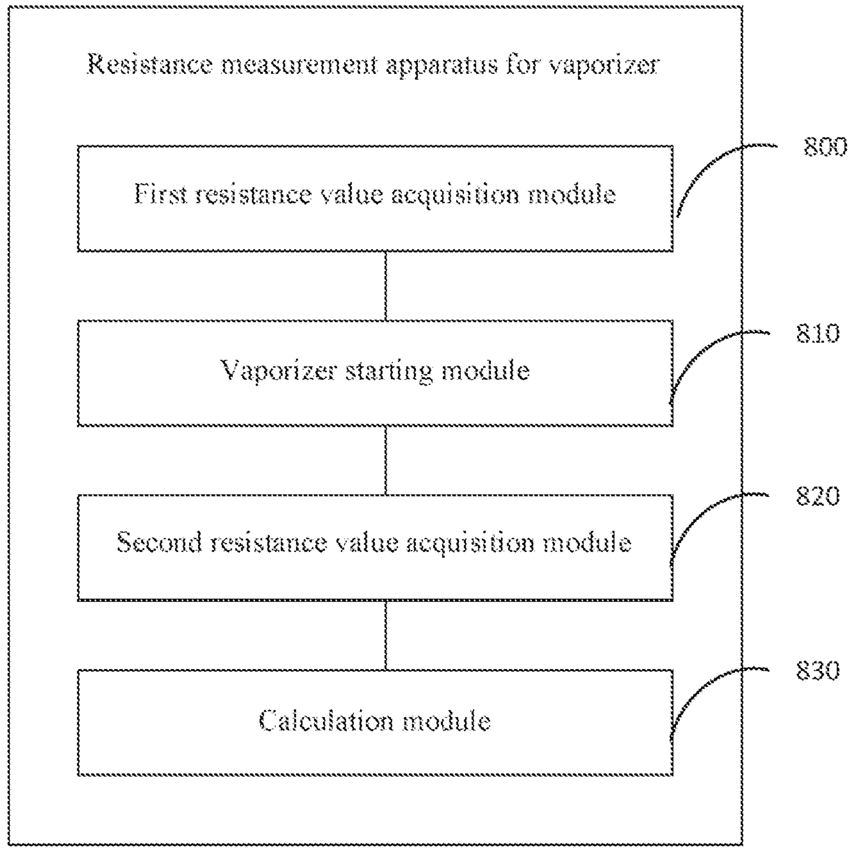
FIG. 8 is a schematic structural diagram of a module of a resistance measurement apparatus for a vaporizer according to an embodiment.

In an embodiment, as shown in FIG. 8, a resistance measurement apparatus for a vaporizer is provided, including:

- a first resistance value acquisition module 800, configured to read a resistance value of the vaporizer every first preset time to obtain a first preset number of first resistance values;
- a vaporizer starting module 810, configured to start the vaporizer and last for a second preset time;
- a second resistance value acquisition module 820, configured to read the resistance value of the vaporizer every third preset time to obtain a second preset number of second resistance values; and
- a calculation module 830, configured to calculate an average value of the first resistance value and the second resistance value as an initial resistance value of the vaporizer.

In an embodiment, the resistance measurement apparatus for a vaporizer further includes:

- a first determination module, configured to determine a fluctuation range of the first resistance value; and
- call the vaporizer starting module 810 to start the vaporizer and last for a second preset time if the fluctuation range of the first resistance value is within a preset fluctuation range: and
- a first alarm module, configured to determine that a state of the vaporizer is abnormal and generate corresponding alarm information if the fluctuation range of the first resistance value is not within the preset fluctuation range.

In an embodiment, the first determination module is further configured to:

- calculate a difference between adjacent first resistance values to obtain a plurality of differences; and
- calculate the fluctuation range of the first resistance value according to the plurality of differences.

In an embodiment, the resistance measurement apparatus for a vaporizer further includes:

- a third resistance value acquisition module, configured to read the resistance value of the vaporizer to obtain a third resistance; and
- call the second resistance value acquisition module 820 to perform the step if the third resistance is within the preset resistance range: read the resistance value of the vaporizer every third preset time to obtain a second preset number of second resistance values; and
- a second alarm module, configured to generate corresponding alarm information if the third resistance is not within the preset resistance range. The second alarm module and the first alarm module may be the same module or different modules.

In an embodiment, the resistance measurement apparatus for a vaporizer further includes:

- a second determination module, configured to determine an average value of the first resistance value and an average value of the second resistance value; and
- call the calculation module 830 to perform the step if a difference between the average value of the first resistance value and the average value of the second resistance value is within a preset difference range: calculate an average of the first resistance value and the second resistance value as the initial resistance value of the vaporizer; and
- a third alarm module, configured to generate corresponding alarm information if the difference between the average value of the first resistance value and the average value of the second resistance value is not within the preset difference range. The third alarm module and the first alarm module may be the same module or different modules.

In an embodiment, the resistance measurement apparatus for a vaporizer further includes:

- a level detection module, configured to detect a port level of a processor in an electronic vaporization device to which the vaporizer belongs; and
- call the first resistance value acquisition module 800 to perform the step if it is detected that the port level of the processor drops: read a resistance value of the vaporizer every first preset time to obtain a first preset number of first resistance values.

In an embodiment, the resistance measurement apparatus for a vaporizer further includes:

- an ambient temperature acquisition module, configured to acquire a current ambient temperature through an ambient temperature sensor; and
- a calibration module, configured to calibrate a temperature parameter in a reference temperature resistance parameter of the vaporizer as the current ambient temperature.

The modules in the resistance measurement apparatus for the vaporizer may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, an electronic vaporization device is provided. The electronic vaporization device includes a memory and a processor. The memory stores a computer program. The processor, when executing the computer program, implements the steps of the embodiment in the resistance measurement method of any of the foregoing vaporizers.

In an embodiment, a computer-readable storage medium is provided. The computer-readable storage medium stores a computer program. The computer program, when executed by the processor, causing the processor to implement the steps of the embodiment in the resistance measurement method of any of the foregoing vaporizers.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a database, or another medium used in the embodiments provided in this application may include at least one of a non-volatile memory and a volatile memory.

The non-volatile memory may include a read-only memory (ROM), a magnetic tape, a floppy disk, a flash memory, an optical memory, a high density embedded non-volatile memory, a resistive memory (ReRAM), a magnetoresistive random access memory (MRAM), a magnetoresistive random access memory (FRAM), a phase change memory (PCM), a graphene memory, and the like. The non-volatile memory may include a random access memory (RAM) or an external cache memory. For the purpose of description instead of limitation, the RAM is available in a plurality of forms, such as a static random access memory (SRAM), a dynamic random access memory (DRAM), or the like. The databases involved in the embodiments provided in this application may include at least one of a relational database and a non-relational database. The non-relational database may include a distributed database based on a block chain, and so on, which is not limited thereto. The processor involved in the embodiments provided in this application may be a general purpose processor, a central processing unit, a graphics processing unit, a digital signal processor, a programmable logic device, a data processing logic device based on quantum computing, and the like, which is not limited thereto.

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A resistance measurement method for a vaporizer, comprising:

reading, from a processor, a resistance value of the vaporizer every first preset time before starting the vaporizer to obtain a first preset number of first resistance values;

after obtaining the first preset number of first resistance values, starting the vaporizer and lasting for a second preset time;

after starting the vaporizer, reading the resistance value of the vaporizer every third preset time to obtain a second preset number of second resistance values; and calculating an average of all of the first resistance values and all of the second resistance values as an initial resistance value of the vaporizer.

2. The method of claim 1, further comprising, before starting the vaporizer and lasting for the second preset time:

determining a fluctuation range of the first resistance value; and performing, if the fluctuation range of the first resistance value is within a preset fluctuation range: starting the vaporizer and lasting for a second preset time; and determining that a state of the vaporizer is abnormal and generating corresponding alarm information if the fluctuation range of the first resistance value is not within the preset fluctuation range.

3. The method of claim 2, wherein determining the fluctuation range of the first resistance value comprises:

calculating a difference between adjacent first resistance values to obtain a plurality of differences; and calculating the fluctuation range of the first resistance value according to the plurality of differences.

4. The method of claim 2, wherein a number of the first resistance values used to determine the fluctuation range of the first resistance value is a natural number greater than or equal to 3.

5. The method of claim 1, further comprising, after starting the vaporizer and lasting for the second preset time and before reading the resistance value of the vaporizer every third preset time to obtain the second preset number of second resistance values:

reading the resistance value of the vaporizer to obtain a third resistance; and performing, if the third resistance is within a preset resistance range: reading the resistance value of the vaporizer every third preset time to obtain a second preset number of second resistance values; and generating corresponding alarm information if the third resistance is not within the preset resistance range.

6. The method of claim 5, wherein the preset resistance range is set such that the third resistance corresponds to a resistance increase of 20 mΩ to 50 mΩ after the vaporizer continues to operate for the second preset time.

7. The method of claim 1, further comprising, before calculating the average of the first resistance value and the second resistance value as the initial resistance value of the vaporizer:

determining an average of the first resistance value and an average of the second resistance value; and performing, if a difference between the average of the first resistance value and the average of the second resistance value is within a preset difference range: calculating an average of the first resistance value and the second resistance value as the initial resistance value of the vaporizer; and generating corresponding alarm information if the difference between the average of the first resistance value and the average of the second resistance value is not within the preset difference range.

8. The method of claim 1, further comprising, before reading the resistance value of the vaporizer every first preset time to obtain the first preset number of first resistance values:

detecting a port level of a processor in an electronic vaporization device to which the vaporizer belongs; and performing, upon detecting that the port level of the processor drops: reading a resistance value of the vaporizer every first preset time to obtain a first preset number of first resistance values.

9. The method of claim 1, further comprising:

acquiring a current ambient temperature through an ambient temperature sensor; and calibrating a temperature parameter in a reference temperature resistance parameter of the vaporizer as the current ambient temperature.

10. An electronic vaporization device, comprising:

a memory storing a computer program; and a processor, wherein, when the processor executes the computer program, the method of claim 1 is implemented.

11. One or more non-transitory computer-readable storage mediums having processor-executable instructions stored thereon, wherein the processor-executable instructions, when executed, facilitate the method of claim 1.

12. A resistance measurement apparatus for a vaporizer, comprising:

a first resistance value acquisition module configured to read, from a processor, a resistance value of the vaporizer every first preset time before starting the vaporizer to obtain a first preset number of first resistance values;

a vaporizer starting module configured to start the vaporizer and last for a second preset time after the first preset number of first resistance values are obtained;

a second resistance value acquisition module configured to read the resistance value of the vaporizer every third preset time to obtain a second preset number of second resistance values after the vaporizer is started; and a calculation module configured to calculate an average of all of the first resistance values and all of the second resistance values as an initial resistance value of the vaporizer.

13. A resistance measurement method for a vaporizer, comprising:

reading a resistance value of the vaporizer every first preset time to obtain a first preset number of first resistance values;

starting the vaporizer and lasting for a second preset time;

reading the resistance value of the vaporizer every third preset time to obtain a second preset number of second resistance values;

calculating an average of all of the first resistance values and the second resistance values as an initial resistance value of the vaporizer; and before reading the resistance value of the vaporizer every first preset time to obtain the first preset number of first resistance values:

detecting a port level of a processor in an electronic vaporization device to which the vaporizer belongs; and performing, upon detecting that the port level of the processor drops: reading a resistance value of the vaporizer every first preset time to obtain a first preset number of first resistance values.

14. The method of claim 13, further comprising, before starting the vaporizer and lasting for the second preset time:

determining a fluctuation range of the first resistance value; and performing, if the fluctuation range of the first resistance value is within a preset fluctuation range: starting the vaporizer and lasting for a second preset time; and determining that a state of the vaporizer is abnormal and generating corresponding alarm information if the fluctuation range of the first resistance value is not within the preset fluctuation range.

15. The method of claim 14, wherein determining the fluctuation range of the first resistance value comprises:

calculating a difference between adjacent first resistance values to obtain a plurality of differences; and calculating the fluctuation range of the first resistance value according to the plurality of differences.

16. The method of claim 13, further comprising, after starting the vaporizer and lasting for the second preset time and before reading the resistance value of the vaporizer every third preset time to obtain the second preset number of second resistance values:

reading the resistance value of the vaporizer to obtain a third resistance; and performing, if the third resistance is within a preset resistance range: reading the resistance value of the vaporizer every third preset time to obtain a second preset number of second resistance values; and generating corresponding alarm information if the third resistance is not within the preset resistance range.

17. The method of claim 13, further comprising, before calculating the average of the first resistance value and the second resistance value as the initial resistance value of the vaporizer:

determining an average of the first resistance value and an average of the second resistance value; and performing, if a difference between the average of the first resistance value and the average of the second resistance value is within a preset difference range: calculating an average of the first resistance value and the second resistance value as the initial resistance value of the vaporizer; and generating corresponding alarm information if the difference between the average of the first resistance value and the average of the second resistance value is not within the preset difference range.

18. The method of claim 13, further comprising:

acquiring a current ambient temperature through an ambient temperature sensor; and calibrating a temperature parameter in a reference temperature resistance parameter of the vaporizer as the current ambient temperature.

19. An electronic vaporization device, comprising:

a memory storing a computer program; and a processor, wherein, when the processor executes the computer program, the method of claim 13 is implemented.

20. One or more non-transitory computer-readable storage mediums having processor-executable instructions stored thereon, wherein the processor-executable instructions, when executed, facilitate the method of claim 13.

* * * * *